(12) United States Patent  
Herrmann

(10) Patent No.: US 8,870,994 B2  
(45) Date of Patent: Oct. 28, 2014

(54) FILTER CASSETTE, FILTER ARRANGEMENT, AND GAS TURBINE WITH SUCH FILTER CASSETTE

(75) Inventor: Torsten Herrmann, München (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 545 days.

(21) Appl. No.: 13/260,934

(22) PCT Filed: Mar. 31, 2010

(86) PCT No.: PCT/EP2010/054279  
§ 371 (c)(1),  
(2), (4) Date: Sep. 29, 2011

(87) PCT Pub. No.: WO2010/112542  
PCT Pub. Date: Oct. 7, 2010

(65) Prior Publication Data  
US 2012/0020773 A1    Jan. 26, 2012

(30) Foreign Application Priority Data  
Apr. 2, 2009    (EP) .................................. 090048992

(51) Int. Cl.  
*F02C 7/052*    (2006.01)  
*B01D 46/00*    (2006.01)  
*B01D 46/52*    (2006.01)  
*B01D 46/12*    (2006.01)

(52) U.S. Cl.  
CPC ............ *F02C 7/052* (2013.01); *B01D 46/0005* (2013.01); *B01D 46/521* (2013.01); *B01D 46/125* (2013.01)  
USPC .............. 55/484; 55/497; 55/521; 415/121.2; 415/169.1

(58) Field of Classification Search  
USPC ........... 55/482, 483, 484, 485, 486, 497, 521; 415/121.2, 169.1  
See application file for complete search history.

(56) References Cited

U.S. PATENT DOCUMENTS 4,225,328 A * 9/1980 Stiehl .............................. 55/378  
5,512,074 A * 4/1996 Hanni et al. .................... 55/484  
(Continued)

FOREIGN PATENT DOCUMENTS

EP    0 479 114    4/1992  
EP    1 447 121    8/2004

OTHER PUBLICATIONS

Ebnother, English Machine Translation of EP 0 479 114, Aug. 4, 1992, translated May 1, 2014 <http://worldwide.espacenet.com/publicationDetails/description?CC=EP&NR=0479114A1&KC=A1&FT=D&ND=3&date=19920408&DB=EPODOC&locale=en_EP>.*

*Primary Examiner* — Edward Look  
*Assistant Examiner* — Wayne A Lambert  
(74) *Attorney, Agent, or Firm* — Amy L. Miller

(57) ABSTRACT

A filter cassette for removing particles from an air stream is provided. The filter cassette has an upstream end, a downstream end, and includes a mounting frame to which a filter media is fitted. The filter has a mounting face positioned between the filter cassette's upstream and downstream ends at a first distance ($D_{up}$) from the upstream end and a second distance ($D_{down}$) from the downstream end. The first and second distances each amount to more than 10% of an overall length of the filter cassette. The mounting face may be positioned centrally between the upstream and downstream ends, approximately in a barycenter line of the filter cassette. The filter cassette thus extends to both sides of the partition opening. Filter surface area is increased and torque induced by the filter cassette into the partition is reduced.

38 Claims, 5 Drawing Sheets

(56) References Cited

U.S. PATENT DOCUMENTS

| | | | |
|---|---|---|---|
| 5,554,203 A * | 9/1996 | Borkent et al. | 55/378 |
| 5,961,931 A * | 10/1999 | Ban et al. | 422/171 |
| 6,368,386 B1 * | 4/2002 | Nelson et al. | 95/268 |
| 6,447,566 B1 * | 9/2002 | Rivera et al. | 55/482 |
| 6,485,538 B1 * | 11/2002 | Toyoshima | 55/490 |
| 6,602,328 B2 * | 8/2003 | Doi et al. | 95/278 |
| 6,955,696 B1 * | 10/2005 | Ost et al. | 55/357 |
| 7,048,501 B2 * | 5/2006 | Katayama et al. | 415/121.2 |
| 2003/0226792 A1 * | 12/2003 | Tumbrink et al. | 210/168 |
| 2005/0235618 A1 * | 10/2005 | Caesar et al. | 55/482 |
| 2007/0209343 A1 | 9/2007 | Cuvelier | |
| 2008/0017038 A1 * | 1/2008 | Wu | 96/154 |
| 2009/0266048 A1 * | 10/2009 | Schwarz | 60/39.092 |

* cited by examiner

FILTER CASSETTE, FILTER ARRANGEMENT, AND GAS TURBINE WITH SUCH FILTER CASSETTE

The present application is a National Phase of International Application Number PCT/EP2010/054279, filed Mar. 31, 2010 and claims priority from European Patent Office Application Number 09004899.2, filed Apr. 2, 2009.

FIELD OF THE INVENTION

The present invention relates to a filter cassette for removal of particles from an air stream and specifically refers to a filter arrangement comprising a partition with an opening in which the filter cassette is mounted. The invention particularly also relates to the use of the filter cassette for removing particles from a gas stream entering a gas turbine as well as to the gas turbine as such, as a specific application. However, the present invention may likewise be used in a variety of other applications, such as in emergency power generators, gas compressors, HVAC systems, gas mining operations where gas from salt stocks is unearthed, and the like.

BACKGROUND OF THE INVENTION

The aforementioned applications have in common that they require a large amount of air to be filtered with high particle filtration efficiency. While a single filter cassette has the capacity for filtering more than 1,000 $m^3$ per hour, with a typical filter size of 592 mm×592 mm×300 mm or 610 mm×610 mm×300 mm filtering about 2,500 to 5,000 $m^3$ per hour, a great number of filter cassettes are used in parallel in order to filter an amount of air of more than 10,000 $m^3$ per hour or even more than 50,000 $m^3$ per hour, and sometimes even much more than that. The filter cassette or cassettes are mounted in a partition separating an upstream volume generally referred to as the "dirty air section" and a downstream volume generally referred to as the "clean air section". The partition may be in the form of a wall with openings in which the filter cassettes are mounted or may be in the form of a rack defining a plurality of openings in which the filter cassettes are mounted so as to create a substantially airtight partition between the dirty air and clean air sections. In certain applications the great number of filter cassettes are provided in a filter house sufficiently large for operating staff to walk through and remove and replace individual filter cassettes when they are clogged or defective.

U.S. Pat. No. 6,368,386 relates to an air filter system in an air intake stream of a gas turbine. Particulate material is filtered from the intake air at a first stage air cleaner and directed to a second stage air cleaner where moisture and, particularly, salt are removed from the intake air. The second stage air cleaner typically includes the aforementioned filter cassettes. Filter material that can advantageously be used as a filter media in the second stage air cleaner is described e.g. in EP 1 674 144 A1. The structure of common filter cassettes is described e.g. in WO 2007/103408, EP 0 560 012 B1 and EP 0 723 800 B1. Accordingly, the filter cassettes typically comprise a plurality of filter panels arranged so that pairs of panel filters form V-pockets extending from the filter cassette's upstream end to the filter cassette's downstream end. Each filter panel is composed of multiple pleats of filter media extending generally parallel to the overall filtration path, so that air or gas to be filtered passes through the pleats in a generally straight manner. The filter panels are mounted in a casing and are air tightly fitted in a mounting frame at the filter cassette's upstream end, or in a few applications at the filter cassette's downstream end. The mounting frame provides a mounting face for mounting the filter cassette to a corresponding mounting face of the partition so that the filter cassette extends into and through the opening of the partition into the clean air section. Staff can then easily remove and replace the filter cassette from the dirty air section side.

It is the object of the present invention to improve the known filter cassettes and filter arrangement, in particular in respect of filtering efficiency, lifetime, and pressure drop.

SUMMARY OF THE INVENTION

Accordingly, the filter cassette of the present invention has an upstream end and a downstream end and comprises a mounting frame to which a filter media is fitted and which has a mounting face adapted for mounting the filter cassette to an opening of a partition, as described hereinbefore in relation to the prior art. According to the invention the mounting face is positioned between the filter cassette's upstream and downstream ends at a first distance from said upstream and a second distance from said downstream end, the first and second distances amounting to more than 10 percent of an overall length of the filter cassette. In particular, the first and second distances are at least 40 mm, more preferably 100 mm or more. This arrangement reduces inducement of torque from the filter cassette into the partition, which torque could lead to improper sealing pressure and could cause air to bypass the frame gasket. Also, torque exceeding the structural integrity of the partition can be prevented.

In preferred embodiments the distance of the mounting face from the up-stream and downstream ends of the filter cassette amounts to more than 15 percent of the overall length of the filter cassette, preferably more than 20 percent and even more preferably more than 25 percent. The absolute value of such distance is preferably 100 mm or more. Most preferably, the mounting face is positioned in a barycenter line of the filter cassette with respect to said upstream and downstream ends. Thus, assuming that the filter cassette has a symmetric structure, the mounting face is advantageously positioned centrally between said upstream and downstream ends.

Another advantage achieved with the proposed structure is that the effective surface area of the filter media can be increased without increasing the length by which the filter cassette protrudes into the clean air section. That is, the filter cassette according to the invention instead extends partly into the dirty air section. This way, existing filter cassettes can be replaced with the proposed filter cassettes having a larger filter surface area, there being no need to adapt the partition or house in which the filter cassettes are mounted. As a result of the increased filter surface area, the filter lifetime will increase because less air will have to pass per partial area of the filter surface and because the air will pass through the filter media at a lower speed.

The proposed arrangement of the mounting frame's mounting face at a position between the upstream and downstream ends of the filter cassette offers even further advantages when not only the mounting face but the entire mounting frame is positioned somewhere between the filter cassette's up-stream and downstream ends. That is, the aforementioned advantages can generally be achieved with the mounting frame being provided at the filter cassette's upstream (or downstream) end and having a length in an upstream-to-downstream direction such that the mounting frame's mounting face is located e.g. at the filter cassette's barycenter line. However, it is particularly advantageous to provide the mounting frame in the area of the filter cassette where the filter cassette is to be mounted to the partition by means of the mounting face and air tightly seal the mounting frame to the filter panels in this area. The weight of the mounting frame and, thus, of the filter cassette is accordingly reduced. Also, torque induced from the filter panels to the filter frame is likewise reduced. Furthermore, side walls, that are provided up-stream of the mounting frame between the filter panels, can be dispensed with between upstream surface sides of adjacent filter panels. The overall weight of the filter cassette is thereby further reduced and, more importantly, the pressure drop across the filter cassette is also substantially reduced. The differential pressure caused by the filter cassette when placed in an air stream is always one of the most critical characteristic values for a filter cassette. A pressure drop of 1,000 Pa can be equivalent to a power loss of the turbine of 1 to 3 percent. Since upstream of the mounting frame side walls are provided only between downstream surface sides of adjacent filter panels and not between the upstream surface sides, the opening area for the air to enter the filter cassette is increased as compared to the opening area of prior art filter cassettes not protruding into the dirty air section. Accordingly, the air to be filtered enters the filter cassette at reduced velocity. Altogether, this will result in a reduced pressure drop across the filter cassette and, thus, improve the performance of the turbine.

Similarly, air flow resistance can be further reduced by providing side walls downstream of the mounting frame only between upstream surface sides of adjacent filter panels, so that the pressure drop across the filter cassette can be further improved. Most preferably, the two measures are combined in that upstream of the mounting frame side walls are provided only between downstream surface sides of adjacent filter panels whereas downstream of the mounting frame side walls are provided only between upstream surface sides of adjacent filter panels.

While it has been described that side walls between filter panels can partly be dispensed with, it is further advantageous to form the top and bottom walls of the filter cassette from filter panels. In general, these walls of the filter cassette can be made from a strong material, such as metal or a stiff polymer material, in order to strengthen the overall structure of the filter cassette. However, when these walls are formed from the two outermost filter panels, they have a filtering function. This allows air to pass through the filter media of the filter cassette not only via the V-pockets from the front end and—where the side walls are partly dispensed with—sideways, but also directly through the two outermost filter panels, i.e. through the top and bottom walls of the filter cassette. The filter cassette's efficiency, lifetime and pressure drop are thereby further enhanced as compared to prior art filter cassettes.

Using such filter cassettes with a filter media providing a particulate filtration efficiency at least of filter class H10, preferably H12 (according to EN 1822), a pressure drop of less than 200 Pa at an air flow of 3,400 cm$^3$ per hour can be achieved. Depending on whether side walls are dispensed with at the upstream side, at the downstream side or at both the upstream and downstream sides, and depending on whether one or both of the two outermost filter panels are provided to have a filter function so that air can pass the filter media also from the top and bottom of the filter cassette, even better values of 180 Pa, 160 Pa, 140 Pa, 120 Pa and even less than 100 Pa can be obtained.

Of course, the pressure drop largely depends upon the material used as the filter media. The material described in EP 1 674 144 A1 is particularly preferred as the filter media for the filter cassette. Other materials are mentioned in the following detailed description of preferred embodiments.

Thus, a filter cassette according to a preferred embodiment of the invention has an upstream end and a downstream end and comprises a mounting frame to which a filter media is fitted and which has a mounting face adapted for mounting the filter cassette to an opening of a partition, wherein said mounting face is positioned between the filter cassette's upstream and downstream ends at a first distance from said upstream end and a second distance from said downstream end, each of said first and second distances amounting to more than 10% of an overall length of the filter cassette, wherein the first and second distances are at least 40 mm.

A filter cassette according to another preferred embodiment of the invention has an upstream end and a downstream end and comprises a mounting frame to which a filter media is fitted and which has a mounting face adapted for mounting the filter cassette to an opening of a partition, wherein said mounting face is positioned between the filter cassette's upstream and downstream ends at a first distance from said upstream end and a second distance from said downstream end, wherein said first and second distances each amount to more than 25% of the overall length.

A filter cassette according to an even further preferred embodiment of the invention has an upstream end and a downstream end and comprises a mounting frame to which a filter media is fitted and which has a mounting face adapted for mounting the filter cassette to an opening of a partition, wherein said mounting face is positioned between the filter cassette's up-stream and downstream ends at a first distance from said upstream end and a second distance from said downstream end, each of said first and second distances amounting to more than 10% of an overall length of the filter cassette, wherein said filter media comprises a plurality of filter panels extending in an upstream-to-downstream direction, wherein said filter panels are interconnected alternately at their upstream and downstream ends and side walls connecting adjacent filter panels are provided so that fluid passing through the filter cassette is forced to pass through said filter panels.

The filter cassette of the above-described types can advantageously be used to remove particles from a gas stream entering a high-capacity gas turbine.

A single filter cassette may have an air flow capacity of between 500 and 6,000 m$^3$ per hour and a plurality of filter cassettes can be used in parallel to filter 1,000 m$^3$ per hour or 4,000 m$^3$ per hour or even more than 10,000 m$^3$ per hour.

DETAILED DESCRIPTION OF THE DRAWINGS

Figure 5:
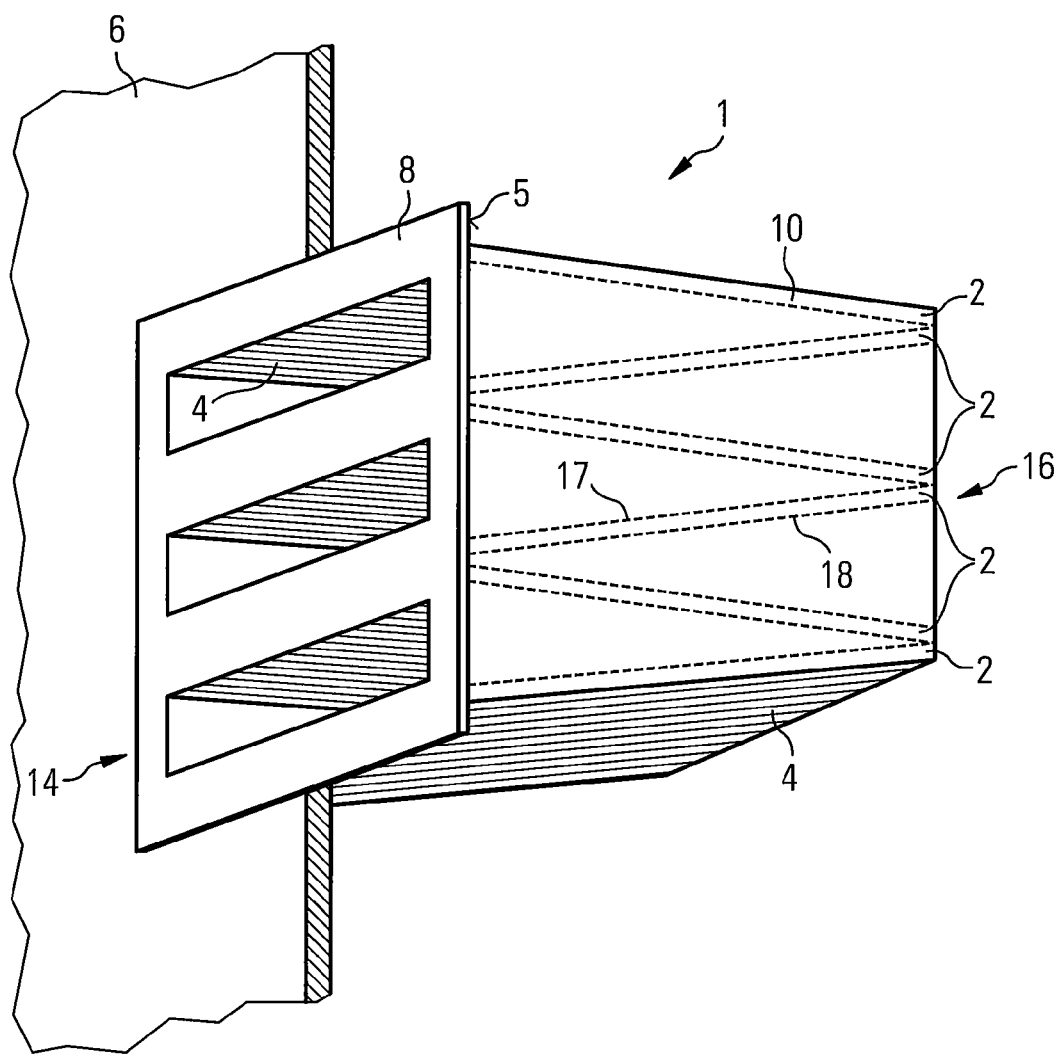
FIG. 5 shows a filter arrangement of a prior art filter cassette.

FIG. 5 shows a prior art filter arrangement with a prior art filter cassette 1 mounted in an opening of a partition 6. The partition 6 shown here has the form of a wall. It separates a dirty air section at the upstream end 14 of the filter cassette from a clean air section at the downstream end 16 of the filter cassette 1. The filter cassette 1 is composed of a plurality of filter panels 2 having a V-bank arrangement extending in an upstream-to-downstream direction. The filter panels 2 are interconnected alternately at their upstream and downstream ends. The connection at the upstream end 14 is in the form of a mounting frame 8. The mounting frame 8 projects laterally so as to form a mounting face 5 on its downstream side. The mounting face 5 surrounds the filter panel package so that the filter cassette 1 can be mounted to the partition 6 via the mounting frame 8 in a substantially air tight manner wherein the mounting face 5 has a sealing function. When air to be cleaned passes through the filter cassette 1, it enters the filter cassette 1 through the openings in the mounting frame 8, passes through the filter media 4 of the filter panels 2 from the upstream surface side 17 thereof to the downstream surface side 18 thereof and exits the filter cassette 1 from the filter cassette's downstream end 16. A typical prior art filter cassette would have a length of about 300 mm and would be designed to be mounted in openings of about 560×560 mm or 580×580 mm.

Side walls 10 provide the strength necessary to maintain the desired V-bank arrangement of the filter panels 2 and force the air to be cleaned to pass through the filter panels 2.

The filter cassette according to the present invention as hereinafter described in relation to a variety of embodiments differs from the prior art structure described above basically only in respect of the mounting frame and mounting face. Therefore, the same reference numerals are used hereinafter to describe the embodiments of the invention.

Figure 1:
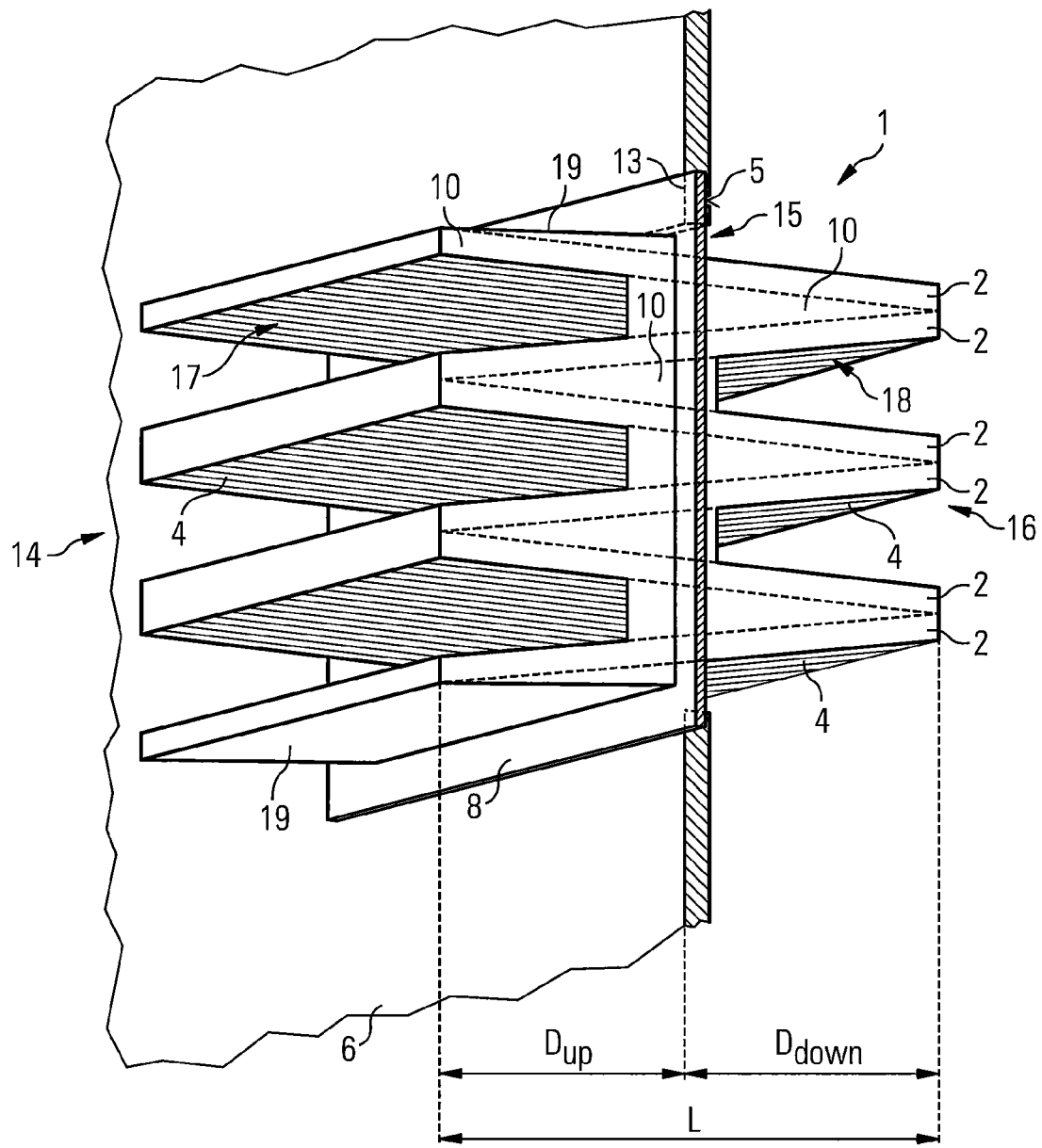
FIG. 1 is a perspective side view of a filter cassette according to the present invention.

FIG. 1 shows a first embodiment of a filter cassette 1 mounted in an opening 15 of a partitioning wall 6. As in the prior art, two adjacent filter panels 2 form one V-bank. The filter panels of each V-bank are air tightly connected at the filter cassette's downstream end 16, e.g. by a suitable potting material. Similarly, the filter panels 2 of two adjacent V-banks are air tightly connected at the filter cassette's upstream end 14, e.g. also by means of a suitable potting material. The mounting frame 8 is so connected to the filter panel package that its mounting face 5 by which the filter cassette 1 is mounted to a corresponding mounting face 13 of the partitioning wall 6 is positioned centrally between the upstream and downstream ends 14, 16 of the filter cassette 1, approximately in the barycenter line of the filter cassette. Therefore, as in the prior art filter cassette, air to be filtered will pass through the upstream surface sides 17 of the filter panel's 2 filter media 4 on the dirty air section side of the filter cassette 1 and exit the filter media 4 on the filter panel's 2 downstream surface side 18 into the clean air section.

The mounting frame 8 not only stabilizes the filter panels 2, but also seals the filter panels 2 and their filter media 4 in a leakage free, i.e. air tight, manner. The filter panels 2 are further stabilized by top and bottom walls 19 made from a strong material, such as a metal or a stiff polymer material. Due to the position of the mounting face 5 approximately at the barycenter line of the overall filter cassette 1, torques induced by the filter cassette 1 into the partition wall 6 are minimized. Also, the upstream-to-downstream length of the filter panels 2 can be doubled from about 300 mm overall length of the filter cassette to about 600 mm overall length of the filter cassette, thereby increasing the filter surface area accordingly. This will improve the filter cassette's life cycle.

It is most preferable to position the mounting face 5 centrally between the filter cassette's upstream and downstream ends 14, 16 with the distances $D_{up}$ from the upstream end 14 and $D_{down}$ from the downstream end 16 being equal or substantially equal where the mounting face is positioned approximately at the barycenter line of the filter cassette. However, the aforementioned positive effects can already be achieved in part when the mounting face 5 is positioned only slightly towards the center of the filter cassette, as compared to prior art filter cassettes where the mounting frame 8 with its mounting face 5 is provided at the upstream (or downstream) end of the filter cassette. It should also be mentioned here that, unlike the embodiment shown in FIG. 1, the mounting face 5 can be provided on the mounting frame's 8 upstream side in cases where the filter cassette is to be mounted into the partitioning wall's 6 opening 15 from the clean air section side or in a reverse arrangement. Alternatively, where the mounting frame 8 exactly fits in the opening 15, the mounting face 5 may be constituted by the mounting frame's surrounding side surface. In either case, the mounting face 5 has a sealing function and may include a gasket.

It should further be noted that, although this is preferable, the mounting frame 8 need not entirely surround the filter panel arrangement or the partitioning wall's opening 15. For instance, if there is otherwise provided a tight fit between the filter panel arrangement and the partitioning wall's opening 15, the mounting frame 8 may be provided only in certain sections, e.g. on the top and bottom sides of the filter cassette, where major torque forces can be expected.

It can further be seen in FIG. 1 that the side walls 10 are partly dispensed with both on the clean air section side of the filter cassette and on the dirty air section side of the filter cassette. Side walls 10 are only provided between adjacent panels in those areas where air flow must be blocked. More specifically, side walls 10 are provided in the dirty air section, i.e. upstream of the mounting frame 8, only between downstream surface sides 18 of adjacent filter panels 2 and in the clean air section, i.e. downstream of the mounting frame 8, only between upstream surface sides 17 of adjacent filter panels 2. The overall area for air to enter the filter cassette is thereby increased so that the velocity of entering air and, accordingly, flow resistance forces are decreased substantially. This has a beneficial effect on the pressure drop caused by the filter cassette in the air stream. Thus, two effects come together: by increasing the length of the filter panels and thus the effective surface area of the filter panels the velocity of the air passing through the filter panels is substantially reduced, and by increasing the cross sectional area for the air to enter the filter cassette due to the partial lack of side walls the air flow velocity is also reduced.

The filter media 4 of the filter panels 2 is pleated in an upstream-to-downstream direction as depicted generally in FIGS. 1 and 6. The pleats itself are directed in this embodiment from the upstream end 14 to the downstream end 16 of the filter cassette. In other embodiments the pleats may extend from one side of the filter panel 2 to the opposite side thereof. The filter media 4 may comprise cellulose or glass fibers or synthetic materials such as polyester non-woven or polypropylene non-woven. It is particularly preferred to use a composite filter media having at least two superposed filtration layers, one of which preferably is a membrane filtration layer and the other a depth filtration layer. The depth filtration layer may comprise nano fibers or glass fibers, a non-woven fibrous polymeric web, such as a spun bond, a non-woven fabric, fiber glass, micro fiber glass, cellulose or polytetrafluoroethylene. Preferably the depth filtration layer is a melt blown web. The melt blown polymer fiber web layer or layers can be made from a variety of polymeric materials, including polypropylene, polyester, polyamide, polyvinylchloride, polymethylmethacrylate and polyethylene, among which polypropylene is the most preferred. Typically, the polymer fibers that form the web have a diameter in the range of about 0.05 µm to about 10 µm, preferably about 1 µm to about 5 µm.

Preferably, at least one depth filtration media is formed as an electret filter media comprising a highly efficient layer having an electrostatic charge. Electric charge is imparted to the melt blown fibers to improve their filtration performance using a variety of known techniques (see e.g. U.S. Pat. No. 5,401,446). Downstream of the composite filter media's depth filtration layer or layers is disposed the membrane filtration layer which is intended to capture particles that pass through the depth filtration layer. A variety of microporous polymeric membranes can be used as the membrane filtration layer, depending on the requirements of the application. The membrane filtration layer may be constructed from the following exemplary materials: nitrocellulose, triacetyl cellulose, polyamide, polycarbonate, polyethylene, polypropylene, polytetrafluoroethylene, polysulfone, polyvinylidene fluoride, acrylate copolymer. The membrane filtration layer is preferably constructed from a hydrophobic material that is capable of preventing the passage of liquids. This is further explained in EP 1 674 144 A1 and U.S. Pat. No. 7,501,003 B. Preferably, the membrane filtration layer is a microporous fluoropolymer, such as an expanded PTFE (ePTFE), fluorinated ethylene propylene (FEP), perfluoroalkoxy polymer (PFA), polypropylene (PP), polyethylene (PE) or ultrahigh molecular weight polyethylene (PE-UHMW). Particularly suitable ePTFE membranes are described in U.S. Pat. No. 5,814,405. For further information on suitable materials, their properties and corresponding test methods reference is made to EP 1 674 144 A1.

The overall size of the filter cassette in FIG. 1 would typically amount to 592 mm×592 mm or 610 mm×610 mm frame size and about 600 mm overall length L. The filter frame may have a thickness of about 20 mm. Typically, three V-banks of filter panels 2 are arranged in the filter cassette. The surface area of the pleated filter media 4 in the filter cassette 1 can exceed 40 m$^2$.

The filter cassettes 1 are preferably used with a filter material providing class H12 particulate filtration efficiency (according to EN 1822) for an air stream of 4,250 m$^3$/h or less. The air to cloth ratio is less than 3 cm/s and the lifetime exceeds 1 year for ambient air. Other characteristic values obtained with the filter cassette of the size described above are: wet burst pressure of over 6,200 Pa, whereas the initial pressure drop at an air flow of 4,250 m$^3$/h is below 300 Pa. At an air flow of 3,400 m$^3$/h, the pressure drop is less than 200 Pa, and where the side walls 10 are partially or substantially dispensed with and depending upon the overall length of the filter cassette, it can be further reduced to less than 180 Pa, 160 Pa, 140 Pa, 120 Pa and even less than 100 Pa.

Figure 2:
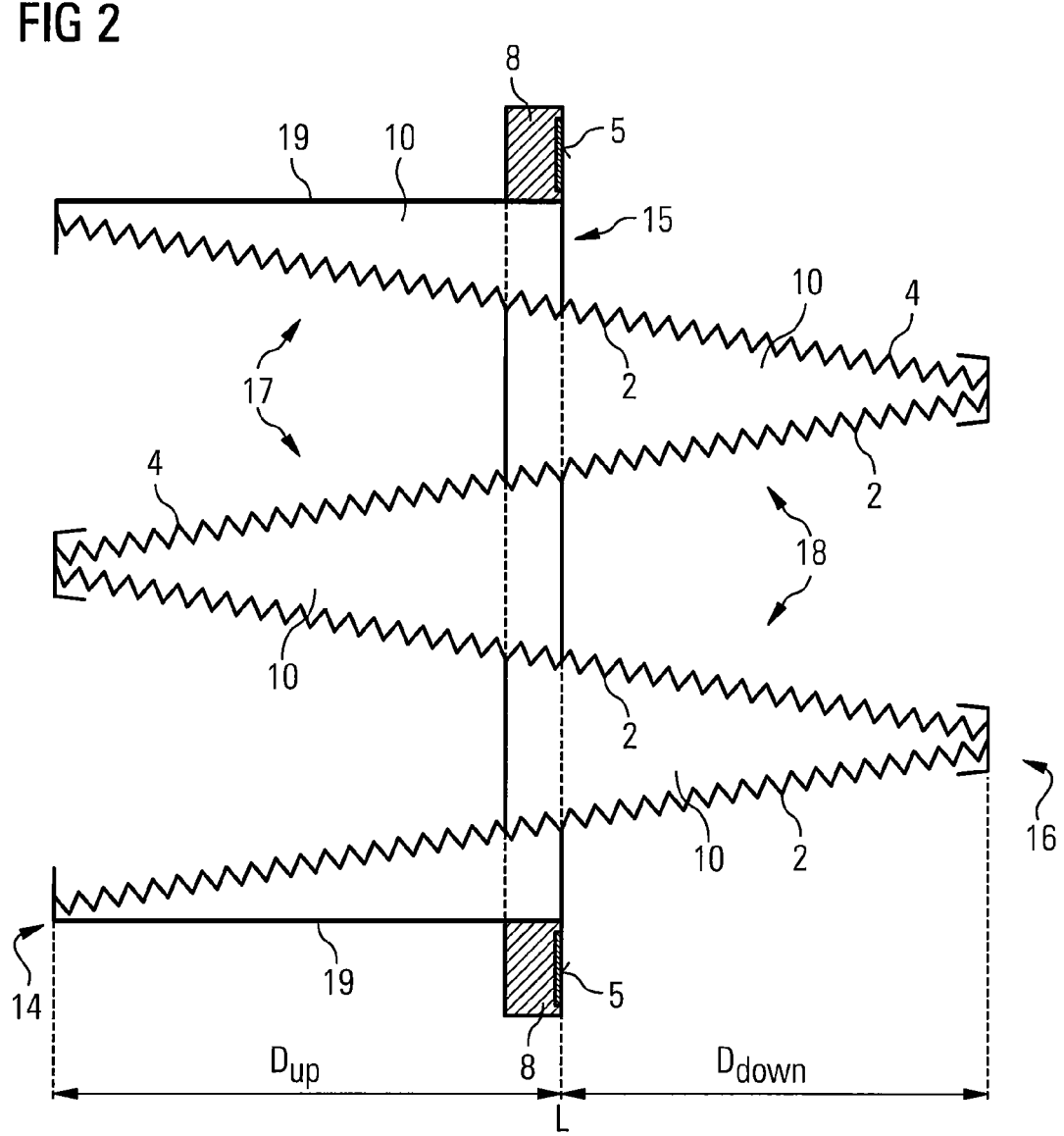
FIG. 2 is a schematic cross sectional view through a filter cassette similar to the one shown in FIG. 1 according to a first embodiment.

FIG. 2 is a schematic cross sectional view of the filter cassette 1 of FIG. 1, but with only two V-banks, i.e. with four filter panels 2. The filter material 4 of the filter panels 4 is pleated such that the pleats extend from one panel side (not shown) to the opposite panel side (not shown) forming a zig-zag configuration of the filter material in said cross sectional view. As can be seen, the mounting frame 8 is attached to upper and lower mounting plates 19 to which the filter panels 2 are connected at their upstream ends. The mounting plates 19 do not have any filter function in this embodiment.

Figure 3:
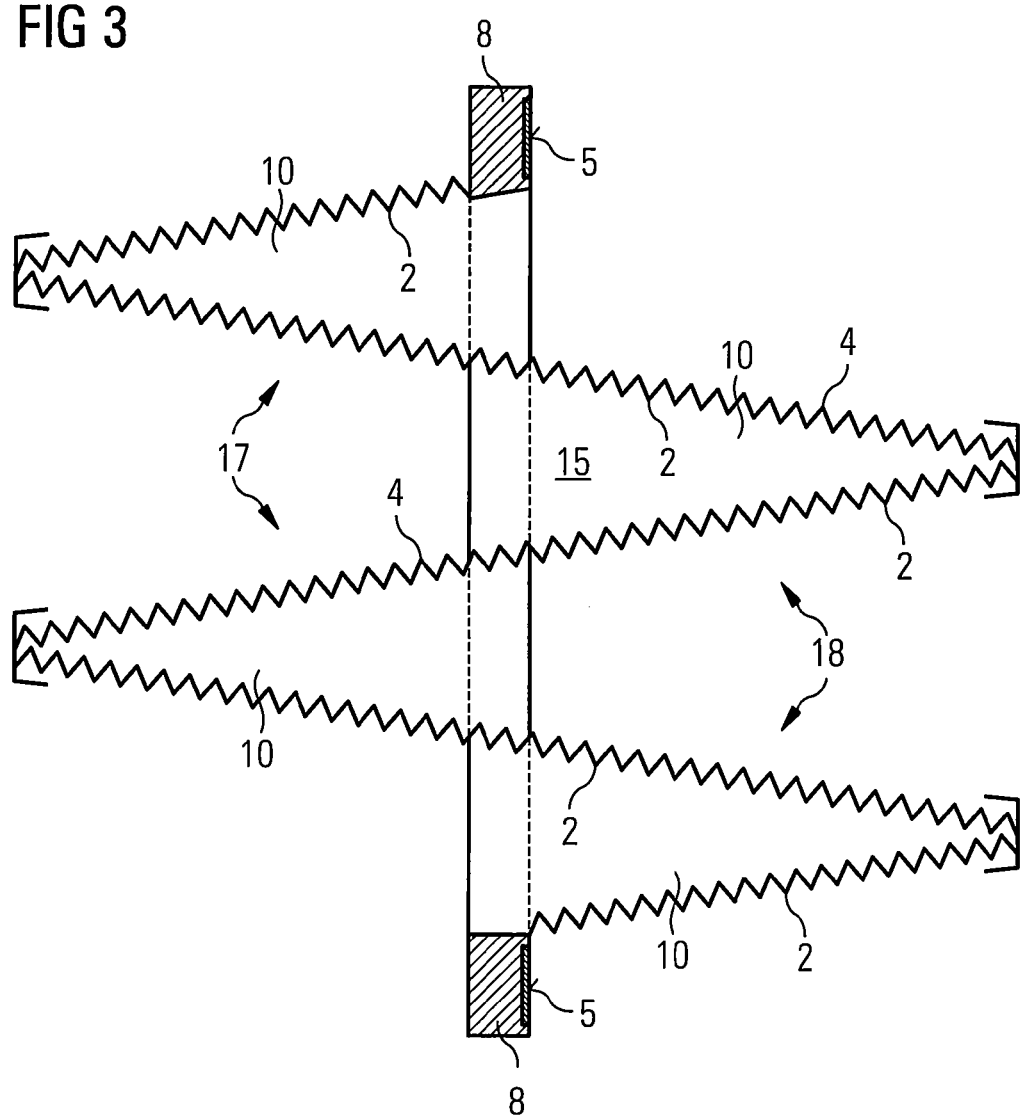
FIG. 3 is a schematic cross sectional view through a filter cassette similar to the one shown in FIG. 1 according to a second embodiment.

FIG. 3 shows a different embodiment in a view similar to FIG. 2. In this embodiment, the two upper and lower mounting plates 19 are dispensed with and are replaced by filter panels 2. As can be seen by a comparison of the embodiments in FIGS. 2 and 3, the amount of filter panel material is the same in both embodiments, but there is more opening area provided on the upstream side (dirty air section) for air to enter the filter cassette. That is, air to be filtered can enter the filter cassette from the upper and lower sides, which upper and lower sides are blocked by the mounting panels 19 in the first embodiment of FIGS. 1 and 2. Accordingly, the pressure drop caused by a filter cassette according to the second embodiment of FIG. 3 will be lower compared to a filter cassette according to the first embodiment under otherwise identical conditions.

Figure 4:
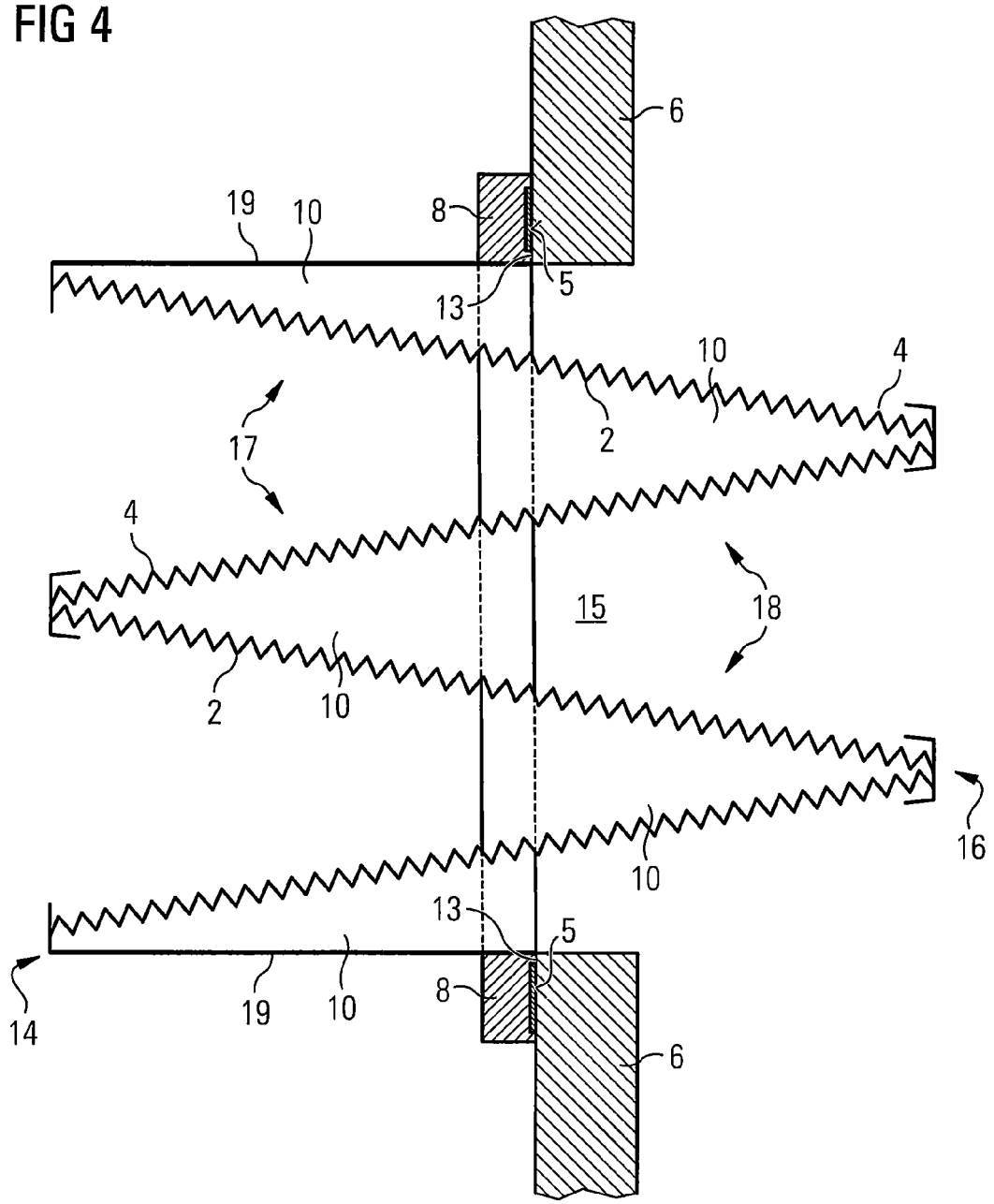
FIG. 4 is a schematic cross sectional view through a filter cassette similar to the one shown in FIG. 1 according to a third embodiment.

FIG. 4 shows an option for mounting the filter cassette 1 of FIGS. 1 and 2 with its mounting face 5 to a partitioning wall 6. FIG. 4 shows the typical arrangement corresponding to the perspective view of FIG. 1, in which the filter panels 2 of the filter cassette 1 extend into the clean air section.

Preferred embodiments of the invention are specified in the following paragraphs:

1. A filter cassette (1) for removal of particles from an air stream, said filter cassette having an upstream end (14) and a downstream end (16) and comprising a mounting frame (8) to which a filter media (4) is fitted and which has a mounting face (5) adapted for mounting the filter cassette to an opening of a partition (6), wherein said mounting face (5) is positioned between the filter cassette's upstream and downstream ends (14, 16) at a first distance ($D_{up}$) from said upstream end (14) and a second distance ($D_{down}$) from said downstream end (16), each of said first and second distances ($Du_{up}$, $D_{down}$) amounting to more than 10% of an overall length (L) of the filter cassette.

2. The filter cassette (1) of para 1, wherein said first and second distances ($D_{up}$, $D_{down}$) are at least 40 mm, more preferably 100 mm or more.

3. The filter cassette (1) of para 1 or 2, wherein said first and second distances ($D_{up}$, $D_{down}$) each amount to more than 25%.

4. The filter cassette (1) of para 1 or 2, wherein said mounting face (5) is positioned centrally between said upstream and downstream ends (14,16) with respect to said overall length (L) of the filter cassette.

5. The filter cassette (1) of any of paras 1 to 4, wherein said mounting face (5) is positioned in a barycenter line of the filter cassette with respect to said up-stream and downstream ends (14, 16).

6. The filter cassette (1) of any of paras 1 to 5, wherein said filter media (4) comprises a plurality of filter panels (2) extending in an upstream-to-downstream direction, wherein said filter panels (2) are interconnected alternately at their upstream and downstream ends (14, 16) and side walls (10) connecting adjacent filter panels (2) are provided so that fluid passing through the filter cassette is forced to pass through said filter panels.

7. The filter cassette (1) of para 6, wherein said filter media (4) is pleated in an upstream-to-downstream direction.

8. The filter cassette (1) of para 6 or 7, wherein said mounting frame (8) is connected to said filter panels (2) in an area of the filter cassette (1) where the filter cassette is to be mounted to said partition (6) by means of said mounting face (5).

9. The filter cassette (1) of para 8, wherein upstream of said mounting frame (8) said side walls (10) are provided only between downstream surface sides (18) of adjacent filter panels (2).

10. The filter cassette (1) of para 8 or 9, wherein downstream of said mounting frame (8) said side walls (10) are provided only between upstream surface sides (17) of adjacent filter panels (2).

11. The filter cassette (1) of para 8, wherein upstream of said mounting frame (8) said side walls (10) are provided only between downstream surface sides (18) of adjacent filter panels (2) and downstream of said mounting frame (8) said side walls (10) are provided only between upstream surface sides (17) of adjacent filter panels (2).

12. The filter cassette (1) of any of paras 8 to 11, wherein the two outermost filter panels extend from said upstream and/or downstream ends (14, 16) to said mounting face (5) and have a filter function.

13. The filter cassette (1) of any of paras 1 to 12, wherein said overall length of the filter cassette is equal to or greater than 250 mm.

14. The filter cassette (1) of any of paras 1 to 13, wherein said mounting face (5) has a sealing function.

15. The filter cassette (1) of any of paras 1 to 14, wherein the filter media (4) has a particulate filtration efficiency of at least filter class H10, preferably filter class H12, according to EN 1822, the filter cassette providing a pressure drop of less than 200 Pa at an air flow of 3,400 m$^3$ per hour.

16. The filter cassette (1) of para 15, wherein the pressure drop at an air flow of 3,400 m$^3$ per hour is less than 180 Pa, preferably less than 160 Pa, more preferably less than 140 Pa, even more preferably less than 120 Pa, most preferably less than 100 Pa.

17. The filter cassette (1) of any of paras 1 to 16, wherein the filter media (4) comprises one or more of the following filter layers: glass fiber filter layer, synthetic fiber filter layer, e.g. made from non-woven polyester or non-woven polypropylene, cellulose filter layer.

18. The filter cassette (1) of any of paras 1 to 17, wherein the filter media (4) is a composite material comprising a plurality of adjacent filter layers, preferably including one or more of the following filter layers: at least one ePTFE membrane, at least one layer of nano fibers, at least one layer of glass fibers, and an electrostatically charged non-woven layer.

19. A filter arrangement comprising a partition (6) having an opening (15) and a mounting face (13) surrounding said opening (15), wherein a filter cassette (1) of any of paras 1 to 18 is mounted to said partition mounting face (13) so that said filter media (4) of the filter cassette projects to both sides of said partition mounting face (13).

20. A gas turbine, comprising one or more than one filter cassette (1) of any of paras 1 to 18 arranged for removing particles from a gas stream entering the gas turbine.

21. The gas turbine of para 20, having an air flow capacity of at least 1,000 m$^3$ per hour, preferably more than 4,000 m$^3$ per hour, more preferably more than 10,000 m$^3$ per hour.

22. The gas turbine of para 20 or 21, wherein at least one filter cassette (1) has an air flow capacity between 500 and 6,000 m$^3$ per hour.

23. Use of the filter cassette (1) of any of paras 1 to 18 for removing particles from a gas stream entering a gas turbine.

24. Use of the filter cassette (1) according to para 23 in an air intake of a gas turbine having an air flow capacity of at least 1,000 m$^3$ per hour, preferably more than 4,000 m$^3$ per hour, more preferably more than 10,000 m$^3$ per hour.

What is claimed is:

1. A filter cassette for removal of particles from an air stream, said filter cassette having an upstream end and a downstream end and comprising a mounting frame to which a filter media is fitted and which has a mounting face adapted for mounting the filter cassette to an opening of a partition,
wherein said mounting face is positioned between the filter cassette's upstream and downstream ends at a first distance from said upstream end and a second distance from said downstream end, each of said first and second distances amounting to more than 10% of an overall length of the filter cassette,
wherein said filter media comprises a plurality of filter panels extending in an upstream-to-downstream direction, wherein said filter panels are interconnected alternately at their upstream and downstream ends and side walls connecting adjacent filter panels are provided so that fluid passing through the filter cassette is forced to pass through said filter panels,
wherein said mounting frame is connected to said filter panels in an area of the filter cassette where the filter cassette is to be mounted to said partition by means of said mounting face, and
wherein upstream of said mounting frame said side walls are provided only between downstream surface sides of adjacent filter panels.

2. The filter cassette of claim 1, wherein said first and second distances are at least 40 mm.

3. The filter cassette of claim 1, wherein said first and second distances each amount to more than 25%.

4. The filter cassette of claim 1, wherein said mounting face is positioned centrally between said upstream and downstream ends with respect to said overall length of the filter cassette.

5. The filter cassette of claim 1, wherein said mounting face is positioned in a barycenter line of the filter cassette with respect to said upstream and downstream ends.

6. The filter cassette of claim 1, wherein downstream of said mounting frame said side walls are provided only between upstream surface sides of adjacent filter panels.

7. The filter cassette of claim 1, wherein upstream of said mounting frame said side walls are provided only between downstream surface sides of adjacent filter panels and downstream of said mounting frame said side walls are provided only between upstream surface sides of adjacent filter panels.

8. The filter cassette of claim 1, wherein the two outermost filter panels extend from said upstream and/or downstream ends to said mounting face and have a filter function.

9. The filter cassette of claim 1, wherein the filter media has a particulate filtration efficiency of at least filter class H10 according to EN 1822 and providing a pressure drop of less than 200 Pa at an air flow of 3,400 m$^3$ per hour.

10. The filter cassette of claim 9, wherein the pressure drop at an air flow of 3,400 m$^3$ per hour is less than 180 Pa.

11. A filter arrangement comprising a partition having an opening and a mounting face surrounding said opening, wherein a filter cassette according to claim 1 is mounted to said partition mounting face so that said filter media of the filter cassette projects to both sides of said partition mounting face.

12. A gas turbine, comprising one or more than one filter cassette according to claim 1 arranged for removing particles from a gas stream entering the gas turbine.

13. The gas turbine of claim 12, having an air flow capacity of at least 1,000 m$^3$ per hour.

14. The gas turbine of claim 12, wherein at least one filter cassette has an air flow capacity between 500 and 6,000 m$^3$ per hour.

15. A filter cassette for removal of particles from an air stream, said filter cassette having an upstream end and a downstream end and comprising a mounting frame to which a filter media having a plurality of filter panels is fitted and which has a mounting face adapted for mounting the filter cassette to an opening of a partition,
wherein said mounting face is positioned between the filter cassette's upstream and downstream ends at a first distance from said upstream end and a second distance from said downstream end, each of said first and second distances amounting to more than 10% of an overall length of the filter cassette, and wherein upstream of said mounting frame, side walls connecting adjacent filter panels are provided only between downstream surface sides of said adjacent filter panels.

16. The filter cassette of claim 15, wherein said plurality of filter panels extend in an upstream-to-downstream direction and are interconnected alternately at their upstream and downstream ends, and wherein said side walls are provided so that fluid passing through the filter cassette is forced to pass through said filter panels.

17. The filter cassette of claim 15, wherein said mounting frame is connected to said filter panels in an area of the filter cassette where the filter cassette is to be mounted to said partition by means of said mounting face.

18. The filter cassette of claim 15, wherein said first and second distances are at least 40 mm.

19. The filter cassette of claim 15, wherein said first and second distances each amount to more than 25%.

20. The filter cassette of claim 15, wherein said mounting face is positioned centrally between said upstream and downstream ends with respect to said overall length of the filter cassette.

21. The filter cassette of claim 15, wherein said mounting face is positioned in a barycenter line of the filter cassette with respect to said upstream and downstream ends.

22. A filter cassette for removal of particles from an air stream, said filter cassette having an upstream end and a downstream end and comprising a mounting frame to which a filter media is fitted and which has a mounting face adapted for mounting the filter cassette to an opening of a partition, wherein said mounting face is positioned between the filter cassette's upstream and downstream ends at a first distance from said upstream end and a second distance from said downstream end, each of said first and second distances amounting to more than 10% of an overall length of the filter cassette, wherein said filter media comprises a plurality of filter panels extending in an upstream-to-downstream direction, and wherein upstream of said mounting frame side walls are provided only between downstream surface sides of adjacent filter panels and downstream of said mounting frame side walls are provided only between upstream surface sides of adjacent filter panels.

23. The filter cassette of claim 22, wherein said filter panels are interconnected alternately at their upstream and downstream ends and said side walls connecting adjacent filter panels are provided so that fluid passing through the filter cassette is forced to pass through said filter panels.

24. The filter cassette of claim 23, wherein said mounting frame is connected to said filter panels in an area of the filter cassette where the filter cassette is to be mounted to said partition by means of said mounting face.

25. The filter cassette of claim 22, wherein the two outermost filter panels extend from said upstream and/or downstream ends to said mounting face and have a filter function.

26. The filter cassette of claim 22, wherein said first and second distances are at least 40 mm.

27. The filter cassette of claim 22, wherein said first and second distances each amount to more than 25%.

28. The filter cassette of claim 22, wherein said mounting face is positioned centrally between said upstream and downstream ends with respect to said overall length of the filter cassette.

29. The filter cassette of claim 22, wherein said mounting face is positioned in a barycenter line of the filter cassette with respect to said upstream and downstream ends.

30. A filter cassette for removal of particles from an air stream, said filter cassette having an upstream end and a downstream end and comprising a mounting frame to which a filter media is fitted and which has a mounting face adapted for mounting the filter cassette to an opening of a partition, wherein said mounting face is positioned between the filter cassette's upstream and downstream ends at a first distance from said upstream end and a second distance from said downstream end, each of said first and second distances amounting to more than 10% of an overall length of the filter cassette, wherein said filter media comprises a plurality of filter panels extending in an upstream-to-downstream direction, and wherein the two outermost filter panels extend from said upstream and/or downstream ends to said mounting face and have a filter function.

31. The filter cassette of claim 30, wherein said filter panels are interconnected alternately at their upstream and downstream ends and side walls connecting adjacent filter panels are provided so that fluid passing through the filter cassette is forced to pass through said filter panels.

32. The filter cassette of claim 31, wherein said mounting frame is connected to said filter panels in an area of the filter cassette where the filter cassette is to be mounted to said partition by means of said mounting face.

33. The filter cassette of claim 30, wherein downstream of said mounting frame side walls are provided only between upstream surface sides of adjacent filter panels.

34. The filter cassette of claim 30, wherein upstream of said mounting frame side walls are provided only between downstream surface sides of adjacent filter panels and downstream of said mounting frame side walls are provided only between upstream surface sides of adjacent filter panels.

35. The filter cassette of claim 30, wherein said first and second distances are at least 40 mm.

36. The filter cassette of claim 30, wherein said first and second distances each amount to more than 25%.

37. The filter cassette of claim 30, wherein said mounting face is positioned centrally between said upstream and downstream ends with respect to said overall length of the filter cassette.

38. The filter cassette of claim 30, wherein said mounting face is positioned in a barycenter line of the filter cassette with respect to said upstream and downstream ends.

\* \* \* \* \*